(12) United States Patent
Dursteler Lopez et al.

(10) Patent No.: US 7,604,350 B2
(45) Date of Patent: Oct. 20, 2009

(54) METHOD FOR CALCULATING AN OPHTHALMIC LENS AND CORRESPONDING LENS

(75) Inventors: Juan Carlos Dursteler Lopez, Barcelona (ES); Javier Vegas Caballero, Barcelona (ES); Roberto Villuela Arroyo, Berlin (DE); Enric Fontdecaba Baig, Barcelona (ES); Juan Esteban Palomar Burdeus, Barcelona (ES)

(73) Assignee: Indo Internacional S.A., Barcelona (ES)

( * ) Notice: Subject to any disclaimer, the term of this patent is extended or adjusted under 35 U.S.C. 154(b) by 24 days.

(21) Appl. No.: 11/579,279

(22) PCT Filed: May 4, 2005

(86) PCT No.: PCT/ES2005/000238

§ 371 (c)(1),
(2), (4) Date: Nov. 1, 2006

(87) PCT Pub. No.: WO2005/109082

PCT Pub. Date: Nov. 17, 2005

(65) Prior Publication Data

US 2007/0225950 A1    Sep. 27, 2007

(30) Foreign Application Priority Data

May 5, 2004  (ES) ............................... 200401134

(51) Int. Cl.
G02C 7/02  (2006.01)
(52) U.S. Cl. ..................................................... 351/177
(58) Field of Classification Search .................. 351/177
See application file for complete search history.

(56) References Cited

U.S. PATENT DOCUMENTS 6,089,713 A   7/2000  Hof
6,789,898 B2  9/2004  Le Saux (Continued)

FOREIGN PATENT DOCUMENTS

EP    0809126 A1    11/1997

(Continued)

OTHER PUBLICATIONS

Written Opinion of the International Searching Authority for PCT/ES05/000238, mailed Jul. 18, 2005 (translation).

(Continued)

*Primary Examiner*—Darryl J Collins
(74) *Attorney, Agent, or Firm*—Mayer Brown LLP

(57) ABSTRACT

Method for calculating an ophthalmic lens comprising [a] calculating and constructing a computational model of an initial lens with a given prescription, [b] calculating the three sections of the optical path traveled by rays using the computational model, [c] determining the first surface of a lens equivalent to the initial lens, and [d] calculating the second surface of the equivalent lens by plotting the rays through the equivalent lens and determining their point of intersection with the second equivalent surface. Each ray has an equivalent optical path equal to the initial optical path, or has at least one of the sections of the equivalent optical path equal to the corresponding section of the initial optical path. The equivalent lens thus calculated is the ophthalmic lens that is the object of the invention.

68 Claims, 9 Drawing Sheets

U.S. PATENT DOCUMENTS

2004/0246440 A1* 12/2004 Andino et al. .............. 351/177

FOREIGN PATENT DOCUMENTS

| EP | 0880046 | A1 | 11/1998 |
| EP | 1376202 | A1 | 1/2004 |
| ES | 2184597 | A1 | 4/2003 |

OTHER PUBLICATIONS

International Preliminary Report on Patentability for PCT/ES05/000238, issued May 30, 2007 (translation).

International Search Report for PCT/ES05/000238, mailed Jul. 18, 2005.

English language translation for abstract of ES2184597A.

* cited by examiner

|     | X        | Y       | Z         |
|-----|----------|---------|-----------|
| p   | ( -2.50  , 8.00   , -50.00 ) |
| v   | ( 0.00   , 0.00   , 1.00 )   |
| p'  | ( -2.50  , 8.00   , -4.67 )  |
| v'  | ( 0.01   , -0.03  , 0.99 )   |
| p"  | ( -2.45  , 7.86   , 0.15 )   |
| v"  | ( 0.00   , -0.01  , 0.99 )   |
| q   | ( -2.50  , 8.00   , -50.00 ) |
| u   | ( 0.00   , 0.00   , 1.00 )   |
| q'  | ( -2.50  , 8.00   , -4.61 )  |
| u'  | ( 0.01   , -0.03  , 0.99 )   |
| q"  | ( -2.45  , 7.84   , 0.20 )   |

FIG. 4

| X | Y | Z | | X | Y | Z |
|---|---|---|---|---|---|---|
| 0.000 | -39.461 | 8.077 | | 0.000 | 0.000 | -0.000 |
| -23.750 | -31.667 | 7.395 | | 7.843 | 0.000 | 0.148 |
| -15.762 | -31.523 | 6.334 | | 15.719 | 0.000 | 0.749 |
| -7.862 | -31.448 | 5.668 | | 23.661 | 0.000 | 1.818 |
| 0.000 | -31.440 | 5.334 | | 31.708 | 0.000 | 3.397 |
| 7.874 | -31.497 | 5.318 | | 39.913 | 0.000 | 5.557 |
| 15.808 | -31.615 | 5.682 | | -31.612 | 7.903 | 4.492 |
| 23.848 | -31.797 | 6.487 | | -23.615 | 7.872 | 2.654 |
| -31.765 | -23.824 | 6.708 | | -15.705 | 7.853 | 1.334 |
| -23.678 | -23.678 | 5.189 | | -7.844 | 7.844 | 0.489 |
| -15.721 | -23.581 | 4.147 | | 0.000 | 7.843 | 0.157 |
| -7.843 | -23.528 | 3.508 | | 7.849 | 7.849 | 0.338 |
| 0.000 | -23.523 | 3.183 | | 15.727 | 7.863 | 1.004 |
| 7.854 | -23.563 | 3.165 | | 23.666 | 7.889 | 2.147 |
| 15.762 | -23.643 | 3.538 | | 31.706 | 7.926 | 3.814 |
| 23.765 | -23.765 | 4.361 | | -31.630 | 15.815 | 5.577 |
| 31.913 | -23.934 | 5.684 | | -23.632 | 15.755 | 3.650 |
| -31.688 | -15.844 | 5.161 | | -15.718 | 15.718 | 2.266 |
| -23.637 | -15.758 | 3.598 | | -7.850 | 15.700 | 1.402 |
| -15.700 | -15.700 | 2.530 | | 0.000 | 15.698 | 1.065 |
| -7.834 | -15.667 | 1.900 | | 7.855 | 15.710 | 1.251 |
| 0.000 | -15.664 | 1.581 | | 15.739 | 15.739 | 1.952 |
| 7.845 | -15.689 | 1.573 | | 23.682 | 15.788 | 3.161 |
| 15.736 | -15.736 | 2.002 | | 31.723 | 15.861 | 4.919 |
| 23.710 | -15.806 | 2.893 | | -31.656 | 23.742 | 7.471 |
| 31.812 | -15.906 | 4.286 | | -23.651 | 23.651 | 5.442 |
| -31.638 | -7.909 | 4.302 | | -15.731 | 23.596 | 3.997 |
| -23.616 | -7.872 | 2.647 | | -7.856 | 23.569 | 3.105 |
| -15.694 | -7.847 | 1.498 | | 0.000 | 23.565 | 2.761 |
| -7.833 | -7.833 | 0.818 | | 7.861 | 23.584 | 2.956 |
| 0.000 | -7.831 | 0.511 | | 15.752 | 23.628 | 3.689 |
| 7.841 | -7.841 | 0.570 | | 23.701 | 23.701 | 4.965 |
| 15.722 | -7.861 | 1.084 | | 31.749 | 23.811 | 6.825 |
| 23.674 | -7.891 | 2.068 | | -23.672 | 31.563 | 8.116 |
| 31.741 | -7.935 | 3.557 | | -15.744 | 31.487 | 6.591 |
| -39.757 | 0.000 | 6.426 | | -7.862 | 31.449 | 5.658 |
| -31.611 | 0.000 | 4.095 | | 0.000 | 31.444 | 5.301 |
| -23.608 | 0.000 | 2.344 | | 7.868 | 31.470 | 5.510 |
| -15.696 | 0.000 | 1.104 | | 15.765 | 31.530 | 6.288 |
| -7.837 | 0.000 | 0.324 | | 23.723 | 31.630 | 7.648 |
| 0.000 | 0.000 | -0.000 | | 0.000 | 39.334 | 8.781 |

FIG. 5

| X | Y | Z |
|---|---|---|
| 0,019 | -40,991 | 4,851 |
| -7,346 | -40,082 | 5,017 |
| 8,181 | -38,400 | 4,368 |
| 9,003 | -38,422 | 4,400 |
| 6,511 | -36,569 | 3,983 |
| 7,327 | -36,587 | 4,004 |
| -8,071 | -34,731 | 4,067 |
| -7,261 | -34,724 | 4,008 |
| 10,537 | -34,026 | 3,664 |
| 11,353 | -34,048 | 3,711 |
| -21,050 | -32,407 | 5,207 |
| -20,225 | -32,381 | 5,068 |
| -8,021 | -31,288 | 3,468 |
| -7,217 | -31,282 | 3,410 |
| 1,604 | -30,445 | 2,906 |
| 2,406 | -30,453 | 2,898 |
| 9,639 | -29,716 | 2,901 |
| 10,448 | -29,732 | 2,942 |
| 16,120 | -29,020 | 3,241 |
| 16,938 | -29,042 | 3,326 |
| 21,021 | -28,315 | 3,708 |
| 21,848 | -28,342 | 3,829 |
| 24,304 | -27,573 | 4,104 |
| 25,137 | -27,602 | 4,251 |
| 25,934 | -26,779 | 4,282 |
| 26,770 | -26,809 | 4,443 |
| 25,898 | -25,929 | 4,163 |
| 26,732 | -25,957 | 4,324 |
| 24,204 | -25,031 | 3,747 |
| 25,032 | -25,056 | 3,894 |
| 20,885 | -24,106 | 3,111 |
| 21,705 | -24,126 | 3,233 |
| 16,792 | -23,189 | 2,485 |
| 17,603 | -23,205 | 2,577 |
| 11,940 | -22,289 | 1,950 |
| 12,743 | -22,300 | 2,007 |
| 6,338 | -21,411 | 1,592 |
| 7,135 | -21,419 | 1,613 |
| 0,781 | -20,564 | 1,484 |
| 1,572 | -20,568 | 1,471 |

| X | Y | Z |
|---|---|---|
| -7,117 | -19,754 | 1,726 |
| -6,327 | -19,752 | 1,674 |
| -15,050 | -19,003 | 2,383 |
| -14,253 | -18,996 | 2,285 |
| -24,690 | -18,310 | 3,903 |
| -23,879 | -18,298 | 3,735 |
| -35,370 | -17,702 | 6,608 |
| -34,534 | -17,682 | 6,349 |
| 25,611 | -17,609 | 3,215 |
| 26,430 | -17,624 | 3,379 |
| 14,276 | -16,645 | 1,495 |
| 15,077 | -16,652 | 1,574 |
| 2,352 | -15,769 | 0,903 |
| 3,142 | -15,773 | 0,899 |
| -10,249 | -14,977 | 1,424 |
| -9,459 | -14,974 | 1,357 |
| -23,805 | -14,267 | 3,327 |
| -23,000 | -14,260 | 3,163 |
| 37,099 | -14,563 | 5,942 |
| -37,712 | -13,653 | 7,095 |
| 22,270 | -13,503 | 2,296 |
| 23,078 | -13,512 | 2,438 |
| 7,092 | -12,608 | 0,658 |
| 7,884 | -12,611 | 0,690 |
| -7,870 | -11,804 | 0,924 |
| -7,083 | -11,803 | 0,870 |
| -23,761 | -11,067 | 3,074 |
| -22,959 | -11,062 | 2,906 |
| 36,958 | -11,272 | 5,791 |
| 37,794 | -11,288 | 6,064 |
| 20,615 | -10,282 | 1,831 |
| 21,418 | -10,287 | 1,964 |
| 3,927 | -9,437 | 0,334 |
| 4,716 | -9,437 | 0,346 |
| -12,602 | -8,653 | 1,094 |
| -11,810 | -8,652 | 1,007 |
| -29,358 | -7,909 | 4,263 |
| -28,551 | -7,905 | 4,046 |
| 31,092 | -7,957 | 3,986 |
| 31,909 | -7,965 | 4,208 |
| 14,211 | -7,080 | 0,811 |

Fig. 12

| X | Y | Z |
|---|---|---|
| 15,005 | -7,082 | 0,900 |
| -3,935 | -6,291 | 0,259 |
| -3,150 | -6,291 | 0,224 |
| -22,116 | -5,503 | 2,447 |
| -21,319 | -5,502 | 2,286 |
| 38,436 | -5,610 | 6,228 |
| 39,266 | -5,618 | 6,523 |
| 19,772 | -4,717 | 1,481 |
| 20,570 | -4,718 | 1,614 |
| 1,570 | -3,931 | -0,013 |
| 2,358 | -3,930 | -0,011 |
| -16,551 | -3,133 | 1,359 |
| -15,760 | -3,133 | 1,237 |
| -34,952 | -2,358 | 5,896 |
| -34,140 | -2,356 | 5,622 |
| 25,359 | -2,352 | 2,512 |
| 26,162 | -2,353 | 2,692 |
| 7,091 | -1,564 | 0,041 |
| 7,879 | -1,563 | 0,084 |
| -11,026 | -0,778 | 0,557 |
| -10,238 | -0,780 | 0,472 |
| -30,086 | 0,027 | 4,369 |
| -29,283 | 0,027 | 4,136 |
| 30,177 | 0,021 | 3,700 |
| 30,985 | 0,020 | 3,922 |
| 11,040 | 0,802 | 0,282 |
| 11,831 | 0,803 | 0,356 |
| -7,093 | 1,577 | 0,135 |
| -6,304 | 1,576 | 0,076 |
| -25,282 | 2,392 | 3,095 |
| -24,486 | 2,391 | 2,900 |
| 35,031 | 2,402 | 5,201 |
| 35,847 | 2,402 | 5,470 |
| 16,584 | 3,173 | 0,934 |
| 17,377 | 3,174 | 1,050 |
| -1,575 | 3,941 | -0,166 |
| -0,787 | 3,941 | -0,183 |
| -19,728 | 4,747 | 1,900 |
| -18,936 | 4,746 | 1,746 |
| -38,147 | 5,580 | 7,294 |
| -37,335 | 5,578 | 6,980 |

| X | Y | Z |
|---|---|---|
| 22,154 | 5,552 | 1,936 |
| 22,951 | 5,554 | 2,098 |
| 3,948 | 6,311 | -0,123 |
| 4,738 | 6,311 | -0,097 |
| -14,205 | 7,103 | 1,002 |
| -13,416 | 7,102 | 0,886 |
| -31,691 | 7,938 | 5,121 |
| -30,889 | 7,936 | 4,865 |
| 28,562 | 7,947 | 3,525 |
| 29,366 | 7,950 | 3,742 |
| 11,852 | 8,692 | 0,493 |
| 12,642 | 8,693 | 0,579 |
| -4,736 | 9,473 | 0,106 |
| -3,946 | 9,473 | 0,065 |
| -21,339 | 10,281 | 2,462 |
| -20,546 | 10,279 | 2,290 |
| -37,353 | 11,138 | 7,373 |
| -36,543 | 11,134 | 7,060 |
| 22,977 | 11,100 | 2,389 |
| 23,775 | 11,103 | 2,562 |
| 7,907 | 11,856 | 0,322 |
| 8,698 | 11,857 | 0,380 |
| -7,111 | 12,643 | 0,463 |
| -6,321 | 12,643 | 0,403 |
| -22,154 | 13,456 | 2,880 |
| -21,360 | 13,454 | 2,700 |
| -36,570 | 14,320 | 7,388 |

Fig. 13

METHOD FOR CALCULATING AN OPHTHALMIC LENS AND CORRESPONDING LENS

FIELD OF THE INVENTION

The invention relates to a method for calculating an ophthalmic lens, comprising a first surface opposite the eye of a user and a second surface orientated towards the user's eye. The invention also relates to an ophthalmic lens made by means of the method according to the invention.

PRIOR ART

Corrective lenses can be of different types, from the simplest, such as myopia corrective lenses to more complex lenses, such as lenses which, simultaneously correct myopia (or hypermetropia), presbyopia and astigmatism. Various methods exist for calculating and manufacturing these lenses. Normally presbyopia corrective lenses (progressive lenses) have a first surface which is the one that produces the progressive effect, while the second surface is a spherical surface or, if astigmatic correction is required, it is a toric surface. An alternative solution consists in the second surface of the lens combining the progressive and astigmatic correction. A surface that simultaneously combines a progressive effect and a toric configuration to correct an astigmatism defect is called a mixed surface. These lenses have the advantage that semi-finished lenses can be manufactured at a low cost, because their first surface is finished, while only one face (usually the second one) needs to be machined to adjust the semi-finished lens to the particular prescription of a user. However these methods require new calculation and design techniques for the new mixed surface, because conventional lens calculation techniques are not applicable. An example of these mixed surfaces can be found in European patent application EP 809.126 A1.

SUMMARY OF THE INVENTION

The aim of the invention is to introduce a new ophthalmic lens calculation method. This objective is achieved by means of a calculation method of the type indicated at the beginning, characterised in that it comprises the following steps:

[a] calculating an initial lens from a given prescription, where the initial lens defines a first initial surface and a second initial surface,

[b] constructing a computational model of the initial lens,

[c] first plotting of a set of rays using the computational model,

[d] calculating the initial optical path traveled by each ray using the computational model, where the initial optical path is the sum of three sections, a first section before the first initial surface, a second section between the first initial surface and the second initial surface and a third section after the second initial surface

[e] determining the first equivalent surface of a lens equivalent to the initial lens,

[f] calculating the second equivalent surface of the equivalent lens by means of the plotting of each ray through the equivalent lens and determining the point of intersection of each ray with the second equivalent surface, where, in order to determine the point of intersection with the second equivalent surface, it is necessary that:

each ray has an equivalent optical path equal to the initial optical path, or each ray has at least one of the sections of the equivalent optical path equal to the corresponding section of the initial optical path, so that the equivalent lens thus calculated is the ophthalmic lens.

In this description and claims the term initial lens is to be understood to be a theoretical lens, calculated to fulfil the prescription defined for the ophthalmic lens that the user must wear and which has been calculated using any known method in the prior art. This initial lens is not produced materially, instead it is only used for constructing a computational model thereof and for calculating the optical paths traveled by the first plotting of the set of rays. The initial lens has a first initial surface and a second initial surface which in principle will be any providing they fulfil the given prescription. Generally (but not necessarily), in the case of progressive lenses, the initial lens is preferably a lens having a progressive first initial surface and a second initial spherical or toric surface, calculated so that they fulfil the given prescription.

Also, in this description and claims the term equivalent lens is to be understood to be a lens having its first and/or second surface (i.e.: the first equivalent surface and/or the second equivalent surface) different from the first initial surface and/or the second initial surface, but which have an effect on a wavefront incident on the equivalent lens that is substantially equal to the effect that said same wavefront would have when incident on the initial lens. In other words, the idea is that the initial lens can be replaced with the equivalent lens without the user thereof having a substantially different perception. As will be mentioned in greater detail below, various alternatives exist, including more or less complex calculation methods, the results of which are more or less accurate. In each particular case, the person skilled in the art will be able to choose which is the most suitable alternative.

It must be clear that the method according to the invention comprises the above-mentioned steps, but the order of execution need not necessarily be the same as the order in which they have been mentioned. For example, some steps may be carried out in parallel, and even in reverse order. Thus, for example, step [e] can be carried out before step [d], and even steps [b] and/or [c]. On the other hand, during the plotting of the rays it is possible (depending on the specific programming used) that some rays have already been arranged through both lenses and the corresponding point of the second equivalent surface has already been determined while other rays have not yet been arranged through the initial lens. Similarly, neither are the steps that are mentioned below in this specification, and which are optional steps, mentioned in what must be necessarily the order in which they are executed.

The method according to the invention makes it possible to calculate lenses with great versatility. On the one hand, it is possible to calculate lenses with non conventional geometries. This affords great freedom to frame design, for example closely enveloping frames. On the other hand it enables lens manufacturing costs to be reduced, particularly vis-à-vis progressive lenses, since a reduced set of semi-finished lenses can be manufactured at a low production cost and the progressive lens can be personalised to the prescription the user requires by machining only one of the surfaces. Although the method is particularly interesting for calculating progressive lenses, it can also be used for calculating any other type of lenses.

The calculation method according to the invention also has the advantage that it does not require a new design technique, instead it is compatible with any design technique known in the prior art. In fact the design technique used will be the one with which the initial lens will be calculated. For example, the technique described in Spanish patent application ES 200100408 can be used, which describes a method for designing progressive lenses having a progressive first surface. Once the initial lens is calculated with the desired design technique, the method of the invention limits itself to calculating a lens equivalent to the initial lens, in other words which will have substantially the same virtues and defects as the initial lens. Particularly, it is possible to use design techniques for conventional lenses wherein the first surface is a progressive surface and the second surface is a toric surface, in other words there is no mixed surface, while the result obtained (the equivalent lens) will have a second mixed surface.

Preferably, in the event that in step [f] it is necessary that each ray has an equivalent optical path that is equal to the initial optical path, step [f] comprises, in turn, the following steps:

[f.1] determining a wavefront made up of the set of rays after passing through the initial lens and determining a direction perpendicular to the wavefront in each point thereof so that each ray has its wavefront point and its perpendicular direction in the wavefront point,

[f.2] second plotting of each ray in the reverse direction, in other words, from its wavefront point and towards the lens, so that the ray is perpendicular to the wavefront,

[f.3] determining a candidate point on each ray in step [f.2], such that the candidate point defines the intersection between the corresponding ray and the second equivalent surface,

[f.4] calculating, for each candidate point, a point of the first equivalent surface such that it complies with its corresponding ray passing the candidate point,

[f.5] calculating the equivalent optical path corresponding to each ray in step [f.4] and checking that its difference vis-à-vis the corresponding initial optical path is less than an error value preset as permissible,

[f.6] if there is a difference greater than the permissible error value, determining a new candidate point and defining an iterative loop with steps [f.3] to [f.6].

In the preceding case, advantageously the first of the candidate points of the iterative loop is a point which is at a distance from its corresponding wavefront point that is equal to the third section of the corresponding initial optical path. This way a rapid convergence is usually obtained.

Also in the preceding case, preferably the calculation of the intersection of each refracted ray with the first equivalent surface of step [f.4] is also done iteratively by means of a second iterative loop. In order to obtain a rapid convergence it is preferable that, in this second iterative loop the corresponding point of the first initial surface is taken as the first approximation of the point of intersection with the first equivalent surface.

Another preferable embodiment of the method according to the invention occurs when in step [f] it is necessary that each ray has the intermediate section of said equivalent optical path equal to the intermediate section of the initial optical path. In this case, preferably step [f] comprises, in addition, the following steps:

[f.1] second plotting of each ray through the first equivalent surface,

[f.2] calculating each of the refracted directions of the rays in step [f.1] once refracted by passing through the first equivalent surface,

[f.3] calculating the shift of each ray in step [f.2], along its refracted direction and from its point of intersection with the first equivalent surface, in a magnitude equal to the distance traveled by the corresponding ray between the first initial surface and the second initial surface, and calculating its final position, which with each ray defines a point on the second equivalent surface, in other words, so that the equivalent optical path has its intermediate section equal to the initial optical path.

As already mentioned, preferably the method is used for calculating progressive lenses, having a first power in its far vision area and a second power in its near vision area. Also preferably the second equivalent surface is a mixed surface, since this way it is possible to concentrate, on one single surface (the second one), all the specific prescription characteristics, and semi-finished lenses can be manufactured with a first finished spherical, aspherical or toric surface, so that it is only necessary to machine the second surface.

Advantageously the first equivalent surface is a spherical or aspherical surface since these surfaces have a relatively reduced number of variants whereby it is possible to manufacture batches of semi-finished lenses at low cost and have them in storage to be personalised subsequently to a particular prescription. Particularly, the semi-finished lenses having a first spherical surface are particularly economical to manufacture. For their part, aspherical surfaces enable the total thickness of the lens to be reduced to obtain better optical features.

Preferably the first equivalent surface is a spherical surface with a power equal to the mean value between the first power and the second power, since by having this mean value in the first equivalent surface it is possible to obtain better results in the calculation of the second equivalent surface. For the same reason it is advantageous that when the first equivalent surface is an aspherical surface, it has a power equal to the mean value between the first power and the second power of the progressive prescription. It is also particularly advantageous that the first equivalent surface has positive asphericalness.

It is also advantageous that the first surface be toric, which can be interesting particularly when calculating lenses for closely enveloping frames, for example for aesthetic reasons.

Another preferable embodiment of the method of the invention is obtained when the first equivalent surface is a progressive surface different from the first initial surface. In fact it is not necessary for the whole progressive effect to be introduced only in the second equivalent surface, instead it is possible that the first equivalent surface also has a certain progressive effect. In this way the total progressive effect can be distributed between the two surfaces, which means slimmer lenses can be obtained.

Advantageously the computational model of the first and second initial surfaces of said initial lens is polynomial, and preferably they are B-spline polynomials, as this way a good balance is achieved between local control and surface smoothness.

As explained above, the second equivalent surface is calculated in a discrete manner, on the basis of calculating a series of points thereon. Logically, the greater the number of points, the better the quality and accuracy of the surface. However, due to practical reasons, the number of points calculated must be limited. It has been proved that for ophthalmic lenses, it is advantageous that the second equivalent surface be calculated with over 1000 points, in other words, that the plotting of the set of rays comprises the plotting of over 1000 rays.

For its part, the definition of the rays also influences the quality of the results obtained. So, all the rays can be from one single family or subset (all parallel to one another, all convergent on a certain point that is on one side or other of the lens) or various subsets of rays can exist, such as for example at least one subset of rays parallel to one another (or various subsets of rays that are parallel but lie in different directions to one another, which for example can be used to simulate the position of objects in different directions in infinitum), at least one subset of rays convergent on a point located on the side of the first initial surface (or various subsets of rays each convergent on a different point, which for example can be used to simulate the position of an object at different distances), and/or at least a subset of rays convergent on a point located on the side of the second initial surface.

Usually, in order to subsequently process the points obtained on the second equivalent surface (for example, for subsequently machining the second equivalent surface) it is necessary that the second equivalent surface be defined as a surface of this type. To do this it is advantageous that the method, subsequent to step [h], includes an interpolation of the points on the second equivalent surface in order to construct the equivalent surface. Advantageously this interpolation includes the calculation of B-splines.

The aim of the invention is also an ophthalmic lens manufactured by means of a method according to the invention.

BRIEF DESCRIPTION OF THE DRAWINGS

Other advantages and characteristics of the invention can be appreciated from the following description, in which, as a non-limiting example, some preferable embodiments of the invention are described, with reference to the accompanying drawings, in which:

FIG. 4, a table of points corresponding to FIGS. 2 and 3.

FIG. 5, a table of co-ordinates X, Y and Z of the second equivalent surface of an equivalent lens calculated by means of a first method according to the invention.

FIGS. 12 and 13, a table of co-ordinates X, Y and Z of the second equivalent surface of an equivalent lens calculated by means of a second method according to the invention.

DETAILED DESCRIPTION OF EMBODIMENTS OF THE INVENTION

Example 1

Example 1 is a particular case of a possible method according to the invention wherein in step [f] it is necessary that each ray has the intermediate section of the equivalent optical path equal to the intermediate section of the initial optical path. In particular, it is an example of a method which also carries out steps [f.1], [f.2] and [f.3] mentioned above.

Figure 1:
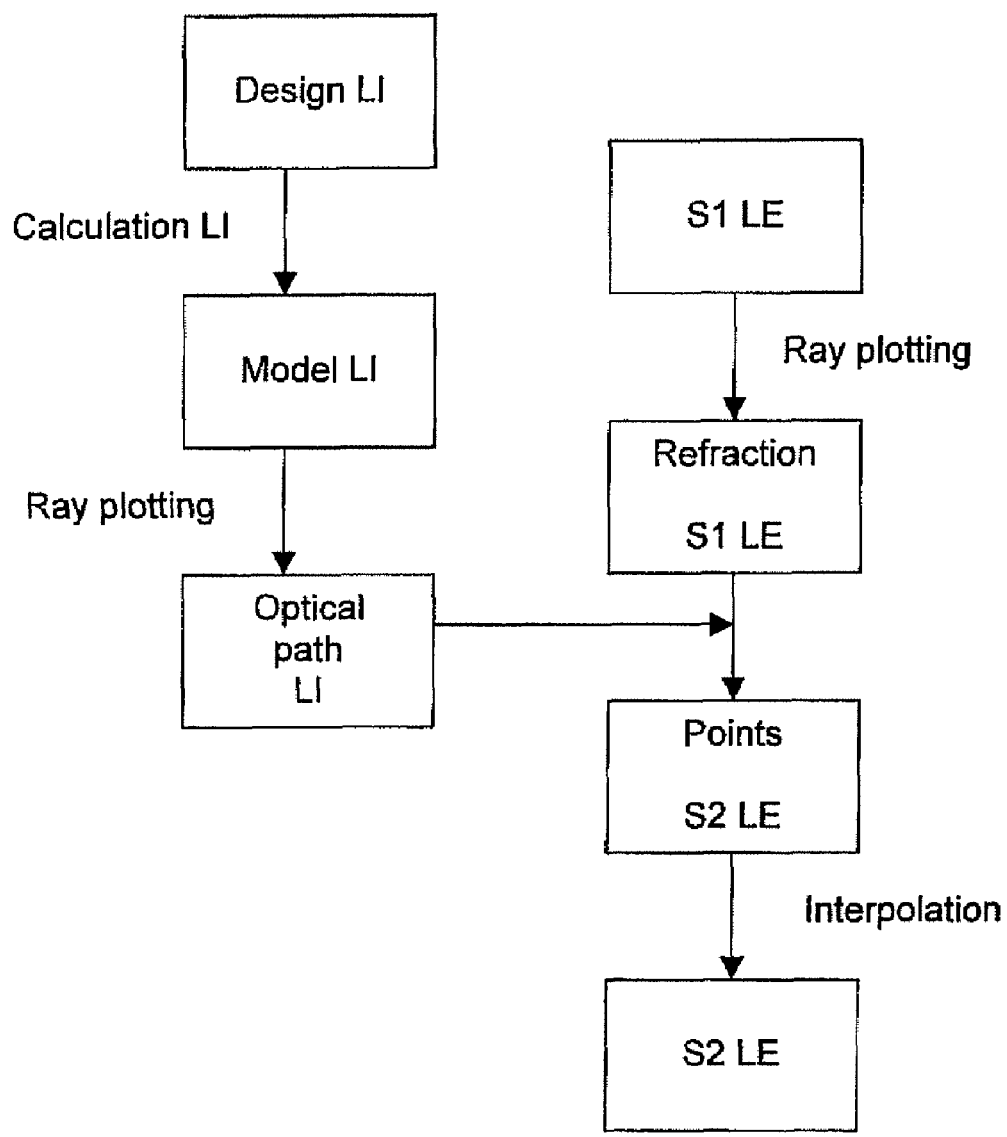
FIG. 1, a flow diagram of a method according to the invention.

FIG. 1 shows the flow diagram of a method according to the invention. The method begins with determining the prescription that a lens must fulfil for a certain user. In addition it is determined which progressive lens (in the event it is a progressive lens) design will be applied to the particular case to be calculated ("Design LI" block). Then the initial lens calculation is carried out ("Calculation LI" step). To carry out this calculation, conventional prior art techniques are used and the computational model of the initial lens is obtained ("Model LI" block). Once this computational model has been obtained, the step of arranging the rays can be started ("Ray plotting" step). This enables the optical path of each ray to be obtained when passing through the initial lens and, therefore it is possible to determine the distance traveled by each ray inside the initial lens ("Optical path LI" step). On the other hand the first equivalent surface of the equivalent lens is determined ("S1 LE" step). Once this first equivalent surface is determined the rays can be plotted ("ray plotting" step), with the same incident rays as in the case of the initial lens and the refraction they undergo when passing through the first equivalent surface is determined ("Refraction S1 LE" step). From here, and taking into account the data on the distances traveled by the rays in the initial lens, it is possible to calculate for each ray the exit point from the equivalent lens. This exit point is a point on the second equivalent surface, whereby a points cloud is obtained ("Points S2 LE" step) which, by means of interpolation ("interpolation" step), enables a second equivalent surface to be obtained ("S2 LE" step).

Figure 2:
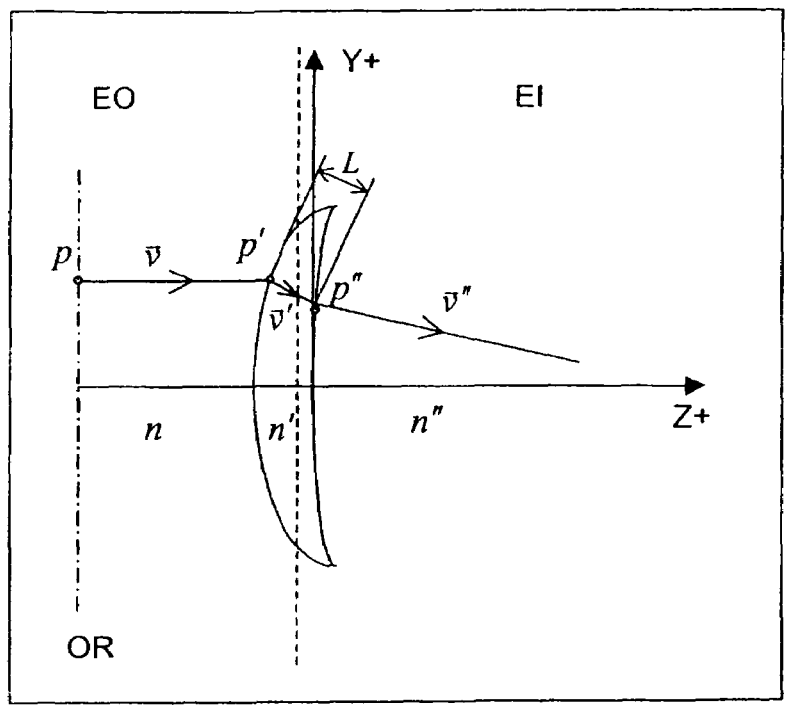
FIG. 2, a diagram of the plotting of an optical ray through an initial lens.
Figure 3:
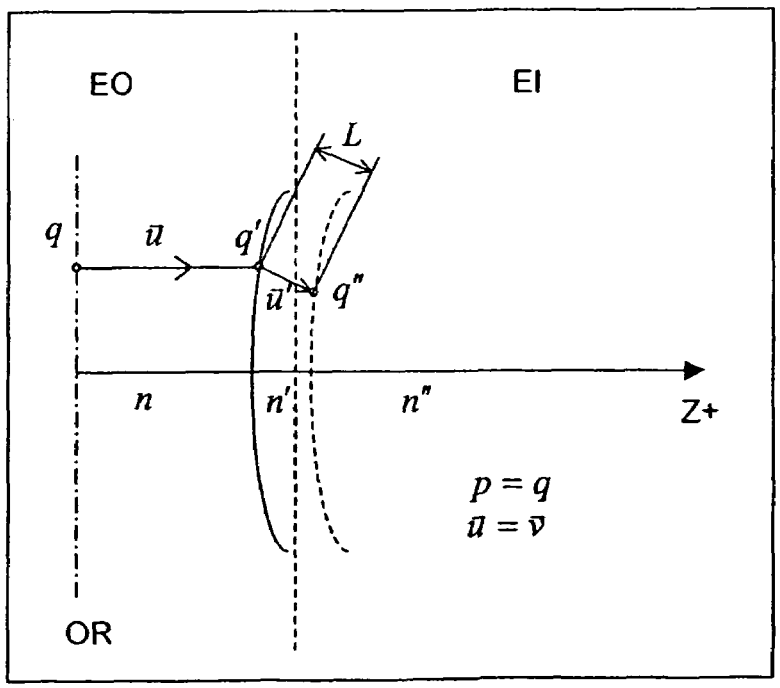
FIG. 3, a diagram of the plotting of an optical ray through an equivalent lens.

FIGS. 2 and 3 show in greater detail the steps carried out. FIG. 2 shows a diagrammatic section of an initial lens along plane X=0, with the positive values of the Z axis towards the right and the positive values of the Y axis upwards. A dotted line indicates the plane separating the object space EO and the image space EI. A line of dots and dashes indicates the rays' plane of origin OR. From a point p on the rays' plane of origin OR a vector $\vec{v}$ is traced which, in this particular example, is horizontal. The first initial surface of the initial lens is known, since it is determined from the prescription and, possibly, from the selected progressive design. Therefore the intersection point p' of ray $\vec{v}$ with the first initial surface can be determined. Also the normal to the first initial surface at point p' is known and the refraction indices n of the object space EO and n' of the material of the initial lens are known. With this data it is possible to calculate the angle formed by $\vec{v}$ with the normal to the first initial surface at p' and, using Snell's law, it is possible to calculate the angle that the refracted ray $\vec{v}'$ will form with said normal. Once the direction of the refracted ray $\vec{v}'$ is known, it is possible to calculate its intersection with the second initial surface, which is also known. This way point p'' is obtained. At point p'' it is possible to re-calculate the normal to the second initial surface, the angle formed between $\vec{v}'$ and said normal, and, again using Snell's law, the angle of the newly refracted ray $\vec{v}''$ In a hypothetical case the refraction index of the image space EI is n'', different from the refraction index of the material of the initial lens n' and different from the refraction index n of origin space EO. In practice both the origin space EO and the image space EI have the same refraction index and they are the surrounding air, therefore, n=n''=1. Through these steps it is possible to calculate the distance L that the ray travels inside the initial lens.

Once the above data has been calculated, the sequence represented in FIG. 3 can begin. From a point q on the rays' plane of origin, and coinciding with point p above, a ray $\vec{u} = \vec{v}$ is traced. The first equivalent surface is also known, because it has been determined beforehand. Therefore it is possible to calculate the point of intersection between the first equivalent surface and the vector $\vec{u}$, thus obtaining point q'. Also it is possible to determine the normal of the first equivalent surface in point q', the angle between this normal and vector $\vec{u}$, and the angle between this normal and the refracted ray $\vec{u}'$ In the particular example in FIGS. 2 and 3 it has been considered that both lenses (the initial lens and the equivalent lens) have the same refraction index n', however it would be perfectly possible to carry out the method according to the invention with the refraction index of the equivalent lens being different from the refraction index of the initial lens and, in fact, in some cases this will be advantageous. Point q' and vector $\vec{t}'$ being known, point q" is calculated taking into account that q" is at the distance L from point q' and in the direction of $\vec{t}'$. This point q" is a point on the second equivalent surface. FIG. 4 shows a table with a calculated numerical example: co-ordinates X, Y and Z are shown of points p, p', p", q, and q' and components X, Y and Z of vectors $\vec{t}$, $\vec{t}'$, $\vec{t}''$, $\vec{t}'''$, and $\vec{t}''''$, all in millimeters, of a real case calculated as explained above. Repeating the method in FIGS. 2 and 3 for a plurality of rays, a plurality of points on the second equivalent surface would be obtained, which could be interpolated subsequently. In fact, these points are particular cases of the data shown in FIG. 5.

FIG. 5 shows co-ordinates X, Y and Z of the second equivalent surface of an equivalent lens, where said second equivalent surface is mixed. The equivalent lens has 2 diopters of spherical correction, −2 diopters of cylindrical correction at 0° and an addition of 2 diopters, for a right eye. To calculate it, a set of incident rays parallel to axis Z has been traced. The refraction indices were both equal to one another and equal to 1.523.

Figure 6:
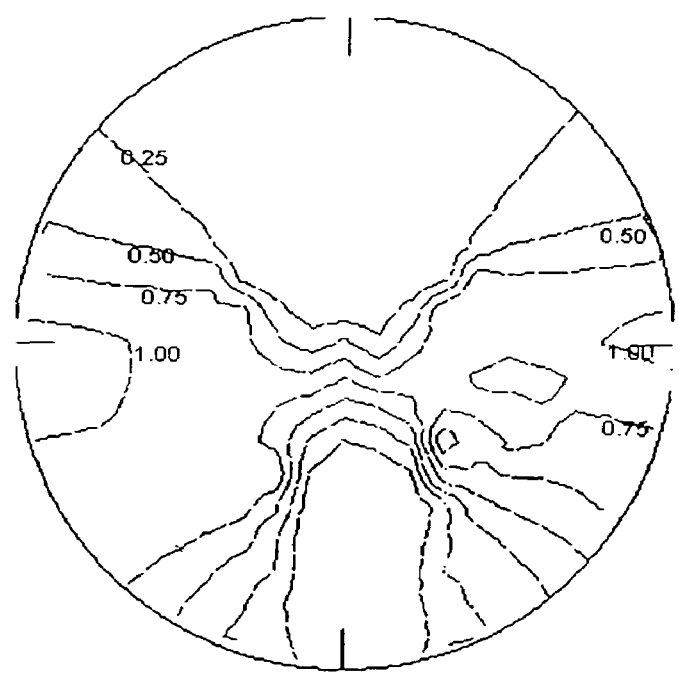
FIG. 6, a power map of an initial lens.
Figure 7:
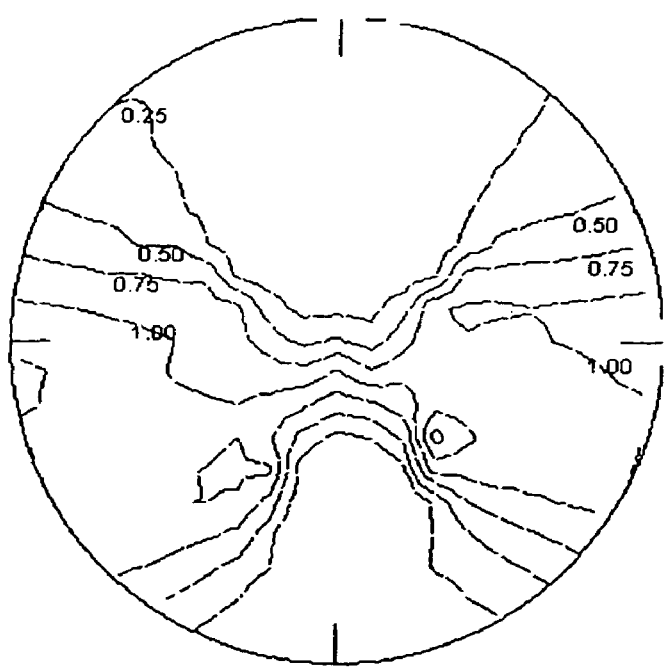
FIG. 7, a power map of a lens equivalent to the lens in FIG. 6

FIG. 6 shows a power map of an initial lens with 0 diopters of spherical correction, 0 diopters of cylindrical correction and an addition of 2 diopters. For its part, FIG. 7 shows the power map of a lens equivalent to the lens in FIG. 6, obtained by means of the method of the invention. As it can be seen, both maps are substantially the same whereby the equivalent lens is substantially equal to the lens designed and manufactured by means of conventional methods.

Example 2

Example 2 is a particular case of a possible method according to the invention wherein in step [f] it is necessary that each ray has the equivalent optical path equal to the initial optical path. In particular, it is an example of a method that also carries out steps [f.1], [f.2], [f.3], [f.4], [f.5] and [f.6] mentioned above.

Theoretical-Analytical Approach:

The aim is to obtain a lens that deforms an incident wavefront such that the same wavefront is obtained as with a conventional progressive lens, that is, so that with one and the same incident wavefront, the resulting wavefront is the same with the two lenses.

Figure 8:
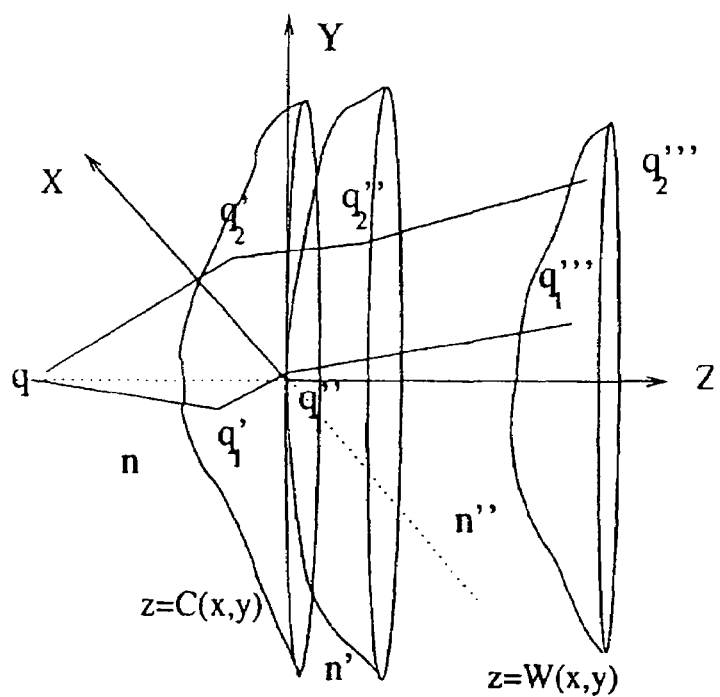
FIG. 8, a general diagram of the plotting of rays.

It can be supposed that the wavefront created by the initial lens is given by the equation z=W (x, y). Said wavefront can be calculated by a ray plotting program if the initial lens is modelled. This is to find which surface on the second face enables said wavefront to be obtained from a first known face z=C(x, y), normally (but not necessarily) spherical. FIG. 8 shows the general case. A light source located at point $P_0$" emits rays that, after passing through the two surfaces, form the wavefront z=W(x, y).

The points in FIG. 8 are:

$q'_1(X_c, Y_c, C(X_c, Y_c)) q'_2(\tilde{x}_c, \tilde{y}_c, C(\tilde{x}_c, \tilde{y}_c))$ $q''_1(0,0,0) q''_2(x,y,z)$ $q'''_1(\hat{x}, \hat{y}, W(\hat{x}, \hat{y})) q'''_2(\bar{x}, \bar{y}, W(\bar{x}, \bar{y}))$ (1)

with object in point q (0,0, $-z_0$). The fact that $q_1$" is chosen as co-ordinate origin does not imply any loss of generality, at all events it fixes the thickness of the centre of the lens. In the event no solution is found it would be necessary to change the initial thickness of the centre.

The wavefront is given by all the points that have traveled one and the same optical path. Consequently, the optical paths of the ray leaving from q and arriving at $q_1$''' and of the ray travelling from q to $q_2$''' are equal. Also it is fulfilled that the rays are perpendicular to the wavefront. This implies that at point $q_1$''':

$$\hat{x} + W(\hat{x}, \hat{y}) \frac{\partial W}{\partial x}(\hat{x}, \hat{y}) = 0 \qquad (2)$$

$$\hat{y} + W(\hat{x}, \hat{y}) \frac{\partial W}{\partial y}(\hat{x}, \hat{y}) = 0$$

Whereby it is possible to determine $\hat{x}, \hat{y}$. For the second ray, the condition of orthogonality at $q_2$''' is $$\bar{x} - x + (W(\bar{x}, \bar{y}) - z) \frac{\partial W}{\partial x}(\bar{x}, \bar{y}) = 0 \qquad (3)$$

$$\bar{y} - y + (W(\bar{x}, \bar{y}) - z) \frac{\partial W}{\partial y}(\bar{x}, \bar{y}) = 0$$

Whereby it is possible to determine $\bar{x}(x, y, z)$, $\bar{y}(x, y, z)$. With this the equality of optical paths is $$n\sqrt{X_c^2 + Y_c^2 + (z_0 + C(X_c, Y_c))^2} + \qquad (4)$$

$$n'' W(\hat{x}, \hat{y}) \sqrt{1 + W_x(\hat{x}, \hat{y})^2 + W_y(\hat{x}, \hat{y})^2} +$$

$$n' \sqrt{X_c^2 + Y_c^2 + C(X_c, Y_c)^2} =$$

$$n' \sqrt{(x - \tilde{x}_c)^2 + (y - \tilde{y}_c)^2 + (z - C(\tilde{x}_c, \tilde{y}_c))^2} +$$

$$n \sqrt{\tilde{x}_c^2 + \tilde{y}_c^2 + (C(\tilde{x}_c, \tilde{y}_c) - z_0)^2} +$$

$$n''(W(\bar{x}, \bar{y}) - z) \sqrt{1 + W_x(\bar{x}, \bar{y})^2 + W_y(\bar{x}, \bar{y})^2}$$

If variables $\hat{x}, \hat{y}, \bar{x}, \bar{y}, X_c, Y_c, \tilde{x}_c, \tilde{y}_c$ are associated with variables x, y, then equation 4 gives the implicit expression of the surface to be found. Below, the problem is posed in an analytical way. However, in various cases the analytical solution will not be viable or it will be very complex, and therefore it can be advisable to use approximate solution methods. Below, a possible approximate calculation method will be proposed.

In order to study in greater detail the trajectories of the two rays in FIG. 8, the refraction on the second face (see FIG. 9) is analysed. It is possible to determine angles I e I' thanks to Snell's law, from which the following is obtained:

$$\cos(I) = \frac{\vec{r} \vec{\nabla} C(x^*, y^*)}{|\vec{\nabla} C(x^*, y^*)|} \qquad (5)$$

$$\cos(I') = \sqrt{1 - \frac{n^2}{n'^2} \left(1 - \left(\frac{\vec{r} \vec{\nabla} C(x^*, y^*)}{|\vec{\nabla} C(x^*, y^*)|}\right)^2\right)}$$

$$\sin(I) = \sqrt{1 - \left(\frac{\vec{r} \vec{\nabla} C(x^*, y^*)}{|\vec{\nabla} C(x^*, y^*)|}\right)^2}$$

-continued $$\sin(I') = \frac{n}{n'}\sqrt{1 - \left(\frac{\vec{r}\vec{\nabla}C(x^*, y^*)}{|\vec{\nabla}C(x^*, y^*)|}\right)^2}$$

wherefrom angles I e I' are obtained according to $z_o$ (position of the focal point) and the co-ordinates of the point of incidence x*, y* calculated as the ray's intersection with the first face. The refraction indices of the lens (matter between the two surfaces) and the exterior medium are $n_1$, and $n_o$ respectively.

The direction vector of ray $\vec{u}'$ inside the lens is, on the one hand, on the plane Π formed by the normal to the first face at the point of incidence and the incident ray. On the other hand it forms an angle I' with the normal to the first face at the point of incidence. Therefore, it can be determined calculating the intersection of plane Π with the cone of angle I' around the normal to the first surface at the point of incidence. This intersection has as solutions two straight lines, with the one fulfilling Snell's law being the one that follows the trajectory of the ray inside the lens. Therefore the direction vector $\vec{u}'$ of the ray's trajectory inside the lens is determined according to the co-ordinates of the point of incidence x*, y*. That is, the following can be found:

$$\vec{u}' = (u'_x(x^*,y^*), u'_y(x^*,y^*), u'_z(x^*,y^*)) \quad (6)$$

The first ray is the one passing through $q_1'$, $q_1''$ with direction vector $\vec{u}(X_c, Y_c)$. This implies that the following will be fulfilled:

$$\left.\begin{array}{l} X_c + \lambda_1 u'_x(X_c, Y_c) = 0 \\ Y_c + \lambda_1 u'_y(X_c, Y_c) = 0 \\ C(X_c, Y_c) + \lambda_1 u'_z(X_c, Y_c) = 0 \end{array}\right\}$$

From this equation $X_c$, $Y_c$, $\lambda_1$ can be obtained. Similarly, the second ray has as its direction vector $\vec{w}'(\tilde{x}_c, \tilde{y}_c)$ and passes through $q_2'$, $q_2''$, wherefrom it is deduced that $$\left.\begin{array}{l} \tilde{x}_c + \lambda_2 w'_x(\tilde{x}_c, \tilde{y}_c) = x \\ \tilde{y}_c + \lambda_2 w'_y(\tilde{x}_c, \tilde{y}_c) = y \\ C(\tilde{x}_c, \tilde{y}_c) + \lambda_2 w'_z(\tilde{x}_c, \tilde{y}_c) = z \end{array}\right\}$$

Wherefrom $\tilde{x}_c(x,y,z), \tilde{y}_c(x,y,z)$ can be obtained. With this information all the sought data is obtained. The sought surface is given by equation 4, where the dependency of the different variables appearing therein with co-ordinates x, y, z is already known.

Example 2.1

Case of First Spherical Surface

The analytical solution to the problem described above is difficult to tackle. Therefore it is advantageous to use approximate methods, for example numerical methods. Below, there is shown, as an example, a method for calculating the sought surface in the particular case in which the first face of the equivalent lens is spherical, wherein the inverse trajectory of the rays will be followed. In other words, given the initial lens, the rays are arranged and the points that have travelled one and the same optical path D are obtained. These points define a wavefront, and the directions of the rays upon reaching said point are perpendicular to the wavefront.

The first step consists in, starting from the wavefront, arranging a ray from one point (defined by the straight line passing through the considered point of the wavefront and having the normal to the wavefront at said point as its direction vector, which are numbers which have been obtained by arranging the rays through the initial lens). Following said ray a point q" (X, Y, Z) (see FIG. 10) is determined, after travelling a path d. Next it is analysed whether this point can be the point at which the second refraction is produced and whether, therefore, it is on the second face, which is the surface to be determined. To do this the trajectory of the ray is studied: the incident ray comes from a flat wavefront. Its direction vector will therefore be vector $\vec{k} = (0,0,1)$. Said ray is incident on the first face of the lens, which, as mentioned, is spherical. If it is incident on said face at point q' ($\overline{X}, \overline{Y}, Z$), the normal to the first face at said point is:

$$\vec{n} = \left(-\frac{\overline{X}}{R}, -\frac{\overline{Y}}{R}, \sqrt{1 - \frac{\overline{X}^2 + \overline{Y}^2}{R^2}}\right) \quad (7)$$

where R is the radius of the first face.

By virtue of the law of refraction it is know that the ray inside the lens is in the plane defined by the incident ray and the normal to the first face. This implies that the direction vector of the ray inside the lens $\vec{u}'$ can be expressed as a linear combination of vectors $\vec{n}$ and $\vec{k}$, which is:

$$\vec{u}' = \alpha \vec{n} + \beta \vec{k} \quad (8)$$

Figure 10:
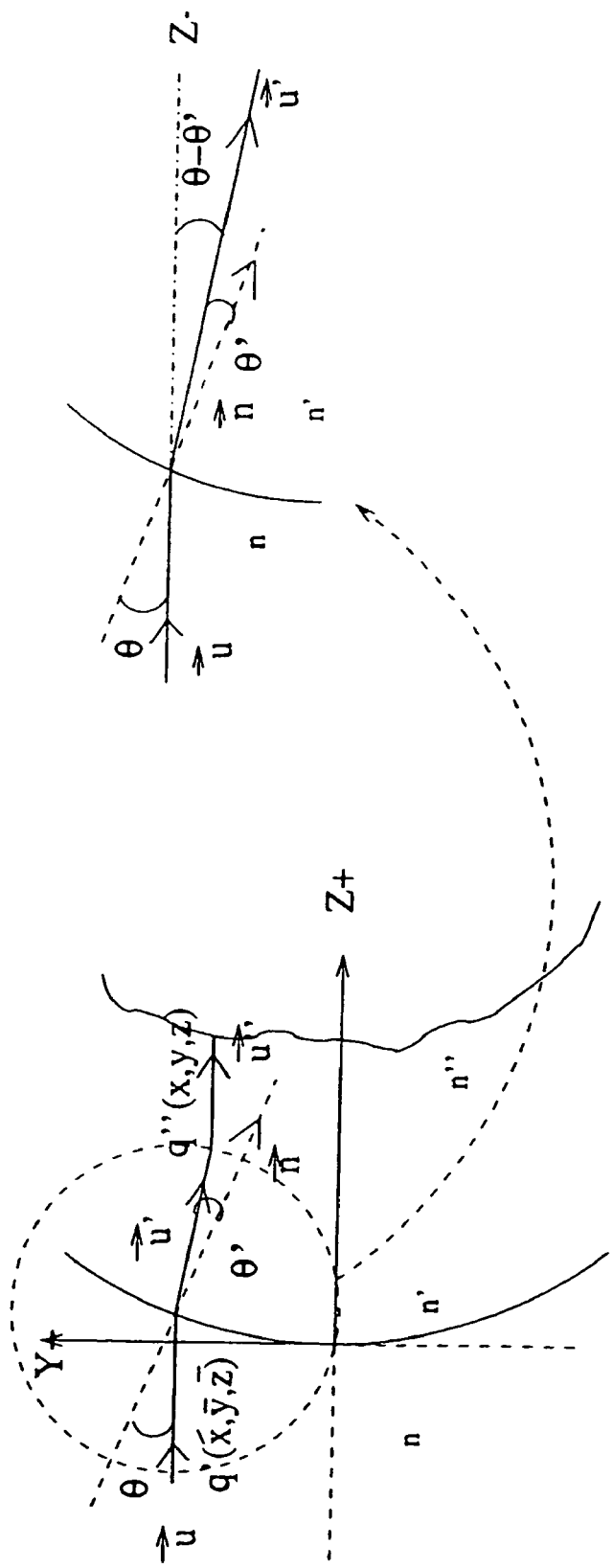
FIG. 10, a diagram of the trajectory of a ray.

On the other hand, from FIG. 10 it can be seen that:

$$\vec{u}' \cdot \vec{n} = \cos\theta' \quad (9)$$

$$\vec{k} \cdot \vec{n} = \cos\theta = \sqrt{1 - \frac{\overline{X}^2 + \overline{Y}^2}{R^2}}$$

$$\vec{u}' \cdot \vec{k} = \cos(\theta - \theta')$$

is fulfilled, and therefore if the trigonometrical associations of these equations are expressed according to known parameters, vector $\vec{u}'$ will be determined.

As can be seen in the second equation (9), angle θ is known according to $\overline{X}, \overline{Y}$ since vectors $\vec{u}'$ and $\vec{u} = \vec{k}$ are known. Angle θ, is associated with angle θ by Snell's law, in other words, n' sin θ'=sin θ (supposing n=n"=1). From here the following can be obtained:

$$\cos\theta = \sqrt{1 - \frac{\rho^2}{R^2}} \quad (10)$$

$$\sin\theta = \frac{\rho}{R}$$

$$\cos\theta' = \sqrt{1 - \frac{\rho^2}{n'^2 R^2}}$$

$$\sin\theta' = \frac{\rho}{n' R}$$

where n' is the refraction index of the lens and $\rho^2 = \overline{X}^2 + \overline{Y}^2$. With this, parameters $\alpha$ and $\beta$ of equation 8 can be determined:

$$\alpha = \cos\theta' - \frac{\cos\theta}{n'} \quad (11)$$

$$\beta = \frac{1}{n'}$$

The expression of vector $\vec{u'}$ according to $\overline{X}, \overline{Y}, \overline{Z}$ is already known. However, on the other hand, as can be seen in FIG. 10, vector $\vec{u'}$ is the unit vector in direction $\overline{q'q''}$ which is:

$$\vec{u'} = \frac{1}{\sqrt{(X-\overline{X})^2 + (Y-\overline{Y})^2 + (Z-\overline{Z})^2}}(X-\overline{X}, Y-\overline{Y}, Z-\overline{Z}) \quad (12)$$

If the two expressions obtained for vector $\vec{u'}$ given by the equations (8) and (12) are equalled, the result is $$\frac{X-\overline{X}}{\sqrt{(X-\overline{X})^2 + (Y-\overline{Y})^2 + (Z-\overline{Z})^2}} = \alpha\frac{\overline{X}}{R} \quad (13)$$

$$\frac{Y-\overline{Y}}{\sqrt{(X-\overline{X})^2 + (Y-\overline{Y})^2 + (Z-\overline{Z})^2}} = \alpha\frac{\overline{Y}}{R}$$

The equation for the third component of the vector is redundant because it can be obtained from the two previous equations. Also, it is known that $\overline{X}^2 + \overline{Y}^2 + (\overline{Z}-R)^2 = R^2$ is fulfilled because point $q'(\overline{X}, \overline{Y}, \overline{Z})$ is on the sphere. Taking into account this condition and the equations (13), $\overline{X}, \overline{Y}, \overline{Z}$ can be obtained according to X, Y, Z, which are the co-ordinates of point q"(X, Y, Z) which is candidate to being on the sought surface.

The next step is to check whether the point is really on the sought surface or not. To do this it must be fulfilled that the optical path traveled by the ray is the correct one, in other words, it is the same as that followed by the rays when the wavefront was created by making the light pass through the initial lens. Mathematically:

$$\overline{Z}n'\sqrt{(X-\overline{X})^2+(Y-\overline{Y})^2+(Z-\overline{Z})^2}+d=D \quad (14)$$

where d is the path traveled by the ray from the wavefront to point q", and D is the total optical path (let us suppose that the optical path was measured from plane Z=0). This equation gives the point's acceptance criterion.

However, not only can points be found on the sought surface, but also the normal to the surface on said points can be found. The key is that the vector normal to surface $\vec{n'}$ is in the plane defined by vectors $\vec{u'}$ and $\vec{u''}$, where $\vec{u''}$ is the ray's direction vector at the exit of the second face. It can be written as a linear combination of $\vec{u'}$ and $\vec{u''}$, which are known:

$$\vec{n'} = \lambda\vec{u'} + \mu\vec{u''} \quad (15)$$

Figures 9, 11:
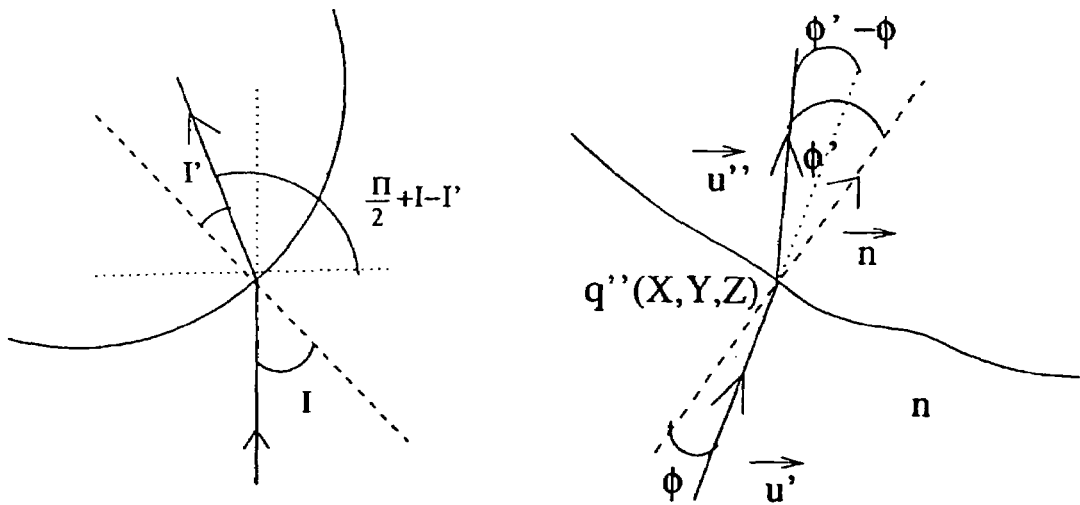
FIG. 9, a diagram of the refraction in the first face of a lens.
FIG. 11, a diagram of the trajectory of a ray when incident on the second face.

As it can be seen in FIG. 11, $$\vec{u'}\cdot\vec{u''} = \cos(\phi'-\phi) = \cos\phi\cos\phi' + \sin\phi\sin\phi' \quad (16)$$

is fulfilled, where $\phi$ and $\phi'$ are associated by Snell's law (supposing n=n"=1):

$$n'\sin\phi = \sin\phi' \quad (17)$$

Therefore, returning to the equation (16) and taking into account Snell's law, the following can be expressed $$\vec{u'}\cdot\vec{u''} = \sqrt{1-n'^2\sin^2\phi}\sqrt{1-\sin^2\phi} - n'\sin^2\phi \quad (18)$$

and from here:

$$\sin\phi = \sqrt{\frac{1-(\vec{u'}\cdot\vec{u''})^2}{1+n'^2}} \quad (19)$$

$$\sin\phi' = n'\sqrt{\frac{1-(\vec{u'}\cdot\vec{u''})^2}{1+n'^2}}$$

Finally, the following is reached:
This determines the normal to the surface at the considered point.

$$\lambda = \frac{1}{1-(\vec{u'}\cdot\vec{u''})^2}\left[\sqrt{\frac{1+n'^2(\vec{u'}\cdot\vec{u''})^2}{1+n'^2}} - (\vec{u'}\cdot\vec{u''})\sqrt{\frac{n'^2+(\vec{u'}\cdot\vec{u''})^2}{1+n'^2}}\right] \quad (20)$$

$$\mu = \frac{1}{1-(\vec{u'}\cdot\vec{u''})^2}\left[\sqrt{\frac{n'^2+(\vec{u'}\cdot\vec{u''})^2}{1+n'^2}} - (\vec{u'}\cdot\vec{u''})\sqrt{\frac{1+n'^2(\vec{u'}\cdot\vec{u''})^2}{1+n'^2}}\right]$$

The last process to carry out is the step of the points cloud and perpendiculars that have been obtained vis-à-vis a surface. To do this it suffices adjusting an analytical surface (such as a B-Spline or NURBS surface) by squared minimums to the points cloud and perpendicular components.

To summarise, to calculate the surface determining the second face of the lens, the method applied in this example is as follows:

The initial lens being known and modelled, rays are arranged therethrough and the points on the rays are obtained such that the optical path traveled is the same for them all. Said points define the wavefront, and the rays' direction vectors define the normals to the wavefront.

Given a point on the wavefront, a ray is arranged that passes therethough and is directed perpendicular to the wavefront and in the direction of the lens. A point q" (X, Y, Z) on the ray is defined, and in order to reach this point it is necessary to travel along an optical path d.

Using the equations (13), co-ordinates $\overline{X}, \overline{Y}, \overline{Z}$ are calculated of point $q'(\overline{X}, \overline{Y}, \overline{Z})$ on the first surface. This is the point impacted by an incident ray so that upon refraction it ends up passing through q"(X, Y, Z).

With the value of X, Y, Z proposed (or equivalently, with the value d proposed for the optical path after passing through the lens) and with the value of $\overline{X}, \overline{Y}, \overline{Z}$ calculated, it is checked whether equation (14) is fulfilled. If not another path d is proposed and a new iteration is carried out, and so on until the appropriate point is found.

Once a point has been found on the surface, the normal of the surface at said point, given by the equation (15), is calculated.

The above mentioned is iterated for many points of the wavefront. In this way, a points cloud on the second surface is calculated as well as the normals associated to said points.

Finally, said points and perpendiculars to an analytical surface (e.g. B-Spline or NURBS) are adjusted by squared minimums.

It can be seen that the proposed method is doubly iterative, because for each iteration while searching for point q" the equations (13) must be solved repeatedly. However, knowing on which straight line q" is found and on which sphere q' is found, simplifies the problem. The algorithm will converge rapidly if it begins with an initial good value. In this sense it is advantageous to choose as starting point $q_0$" a point such that the optical path d traveled by the light to the exit from the lens is the same as in the initial lens. As for the solution of the system (13), it is advantageous that the point where the straight line defined by the ray inside the lens in the initial system intersects with the sphere defining the first face of the equivalent system be taken as the starting point $q_0$'. With these initial points a good operation can be obtained, in other words, a rapid convergence of the method.

Lastly it is important to highlight that, although the method has been described for a first spherical surface, the generalisation to any other geometry of the first face is immediate, since it is only necessary to be able to calculate the intersection of a straight line with said surface and the normal to the surface at said point.

Example 2.2

Numerical Example

The tables in FIGS. 12 and 13 show the data obtained from the calculation of the lens equivalent to a lens having a convex progressive face with the following starting data:

The notation used is the same as that used in the above examples. Points p''' and q''' are points on the wavefront. The optical path traveled is 80 mm. The initial lens is a progressive lens with a sphere of +3 diopters, a cylinder of −1 diopters, the axis at 90° and an addition of 2 diopters.

| Points on initial lens | |
|---|---|
| p = (−2.40, −8.00, −50.00) | v = (0, 0, 1) |
| p' = (−2.40, −8.00, −3.40) | v' = (0.01, 0.05, 0.99) |
| p" = (−2.36, −7.86, 0.44) | v" = (0.01, 0.04, 0.99) |
| p''' = (−2.11, −6.84, 27.97) | '''->Points from wavefront to optical path 80 |

| Points on equivalent lens | |
|---|---|
| q = (−2.41, −8.00, −50.0) | v = (0, 0, 1) |
| q' = (−2.41, −8.00, −3.53) | v' = (0.02, 0.07, 0.99) |
| q" = (−2.33, −7.72, 0.30) | v" = (0.01, 0.03, 0.99) |

-continued

| Points on equivalent lens | |
|---|---|
| q''' = (−2.11, −6.84, 27.92) | '''->Points from wavefront to optical path 80 |

The invention claimed is:

1. A method for calculating an ophthalmic lens, said ophthalmic lens comprising a first surface opposite the eye of a user, and a second surface orientated towards the user's eye, wherein said ophthalmic lens has a first power in its far vision area and a second power in its near vision area and characterized in that it comprises the following steps:
  a. calculating an initial lens from a given prescription, where said initial lens defines a first initial surface and a second initial surface;
  b. constructing a computational model of said initial lens;
  c. first plotting of a set of rays using said computational model;
  d. calculating an initial optical path traveled by each ray using said computational model, wherein said initial optical path is the sum of three sections, a first section before said first initial surface, a second section between said first initial surface and said second initial surface and a third section after said second initial surface;
  e. pre-selecting a first equivalent surface of an equivalent lens to said initial lens, wherein said first equivalent surface is selected from the group consisting of: a spherical surface and an aspherical surface, and has a power equal to the mean value between said first power and said second power; and
  f. calculating a second equivalent surface of said equivalent lens by means of the plotting of each ray through said equivalent lens and determining the point of intersection of each of said rays with said second equivalent surface, where, in order to determine the point of intersection with said second equivalent surface it is necessary that: each ray has an equivalent optical path equal to said initial optical path, or each of said rays has at least one of the sections of said equivalent optical path equal to the corresponding section of said initial optical path, so that said equivalent lens thus calculated is said ophthalmic lens.

2. The method according to claim 1, where in said step f. it is necessary that each of said rays has an equivalent optical path that is equal to said initial optical path, characterized in that said step f. further comprises:
  i. determining a wavefront made up of said set of rays after passing through said initial lens and determining a direction perpendicular to said wavefront at each of the points thereof so that each ray has a wavefront point and a perpendicular direction in said wavefront point;
  ii. second plotting of each of said rays in the inverse direction, in other words, from said wavefront point and towards said initial lens, so that the rays are perpendicular to said wavefront;
  iii. determining a candidate point on each ray in step f.ii., such that said candidate point defines the intersection between a corresponding ray and the second equivalent surface;
  iv. calculating, for each of said candidate points, a point on the first equivalent surface such that it is fulfilled that said corresponding ray passes through said candidate point;

v. calculating the equivalent optical path corresponding to each ray in step f.iv. and checking that its difference vis-a-vis the corresponding initial optical path is less than an error value preset as permissible; and vi. if there is a greater difference than the permissible error value, determining a new candidate point and defining an iterative loop with steps f.iii. to f.vi.

3. The method according to claim 2, characterized in that the first of said candidate points of said iterative loop is a point that is at a distance from its corresponding wavefront point which is equal to said third section of the corresponding initial optical path.

4. The method according to claim 2 or claim 3, characterized in that the calculation of the intersection of each ray refracted with the first equivalent surface in step f.iv. is also repeated by means of a second iterative loop.

5. The method according to claim 4, characterized in that in said second iterative loop the corresponding point of the first initial surface is taken as the first approximation of the point of intersection with said first equivalent surface.

6. The method according to claim 1, characterized in that in said step f. it is necessary that each of said rays has an intermediate section of said equivalent optical path equal to an intermediate section of said initial optical path.

7. The method according to claim 6, characterized in that said step f. further comprises:
   i. second plotting of each of said rays through said first equivalent surface;
   ii. calculating each of the refracted directions of the rays in step f.i. once refracted by passing through said first equivalent surface; and
   iii. calculating the shift of each ray in step f.ii., along its refracted direction and from its point of intersection with said first equivalent surface, in a magnitude equal to the distance traveled by the corresponding ray between said first initial surface and said second initial surface, and calculating its final position, which with each ray defines a point on said second equivalent surface, in other words, so that said equivalent optical path has its intermediate section equal to said initial optical path.

8. The method according to claim 1, characterized in that said ophthalmic lens is a progressive lens.

9. The method according to claim 1, characterized in that said second equivalent surface is a mixed surface.

10. The method according to claim 1, wherein said first equivalent surface is aspherical and has positive asphericalness.

11. The method according to claim 1, characterized in that said first surface is a toric surface.

12. The method according to claim 1, characterized in that said first equivalent surface is a progressive surface different from said first initial surface.

13. The method according to claim 1, characterized in that said computational model of said first and second initial surfaces of said initial lens is polynomial.

14. The method according to claim 13 characterized in that said computational model of said first and second initial surfaces of said initial lens are B-splines polynomials.

15. The method according to claim 1, characterized in that said plotting of a set of rays comprises the plotting of more than 1000 rays.

16. The method according to claim 1, characterized in that said plotting of rays creates at least one subset of rays parallel to one another.

17. The method according to claim 1, characterized in that said plotting of rays creates at least one subset of rays convergent on a point located on the side of the first initial surface.

18. The method according to claim 1, characterized in that said plotting of rays creates at least one subset of rays convergent on a point located on the side of the second initial surface.

19. The method according to claim 1, characterized in that after said step f. an interpolation takes place of said points of said second equivalent surface to construct said equivalent surface.

20. The method according to claim 19, characterized in that said interpolation includes the B-splines calculation.

21. An ophthalmic lens characterized in that it is manufactured by means of a method according to claim 1.

22. An ophthalmic lens characterized in that it is manufactured by means of a method according to claim 20.

23. The method for calculating an ophthalmic lens, said ophthalmic lens comprising a first surface opposite the eye of a user, and a second surface orientated towards the user's eye, comprising the following steps:
   a. calculating an initial lens from a given prescription, where said initial lens has a first initial surface and a second initial surface;
   b. constructing a computational model of said initial lens;
   c. first plotting of a set of rays using said computational model;
   d. calculating an initial optical path traveled by each ray using said computational model, wherein said initial optical path is the sum of three sections, a first section before said first initial surface, a second section between said first initial surface and said second initial surface and a third section after said second initial surface;
   e. pre-selecting a first equivalent surface of an equivalent lens to said ophthalmic lens, wherein said first equivalent surface is a progressive surface different from said first initial surface; and
   f. calculating a second equivalent surface of said equivalent lens by means of the plotting of each ray through said equivalent lens and determining the point of intersection of each of said rays with said second equivalent surface, where, in order to determine the point of intersection with said second equivalent surface it is necessary that: each ray has an equivalent optical path equal to said initial optical path, or each of said rays has at least one of the sections of said equivalent optical path equal to the corresponding section of said initial optical path, so that said equivalent lens thus calculated is said ophthalmic lens.

24. The method according to claim 23, where in said step f. it is necessary that each of said rays has an equivalent optical path that is equal to said initial optical path, characterized in that said step f further comprises:
   i. determining a wavefront made up of said set of rays after passing through said initial lens and determining a direction perpendicular to said wavefront at each of the points thereof so that each ray has a wavefront point and a perpendicular direction in said wavefront point;
   ii. second plotting of each of said rays in the inverse direction, in other words, from a wavefront point and towards said initial lens, so that the rays are perpendicular to said wavefront;
   iii. determining a candidate point on each ray in step f.ii., such that said candidate point defines the intersection between a corresponding ray and the second equivalent surface, iv. calculating, for each of said candidate points, a point on the first equivalent surface such that it is fulfilled that said corresponding ray passes through said candidate point, v. calculating the equivalent optical path corresponding to each ray in step f.iv. and checking that its difference vis-a-vis the corresponding initial optical path is less than an error value preset as permissible; and vi. if there is a greater difference than the permissible error value, determining a new candidate point and defining an iterative loop with steps f.iii. to f.vi.

25. The method according to claim 24, characterized in that the first of said candidate points of said iterative loop is a point that is at a distance from its corresponding wavefront point which is equal to said third section of the corresponding initial optical path.

26. The method according to claim 24 or claim 25, characterized in that the calculation of the intersection of each ray refracted with the first equivalent surface in step f.iv. is also repeated by means of a second iterative loop.

27. The method according to claim 26, characterized in that in said second iterative loop the corresponding point of the first initial surface is taken as the first approximation of the point of intersection with said first equivalent surface.

28. The method according to claim 23, characterized in that in said step f. it is necessary that each of said rays has an intermediate section of said equivalent optical path equal to an intermediate section of said initial optical path.

29. The method according to claim 28, characterized in that said step f. further comprises:
   i. second plotting of each of said rays through said first equivalent surface;
   ii. calculating each of the refracted directions of the rays in step f.i. once refracted by passing through said first equivalent surface; and
   iii. calculating the shift of each ray in step f.ii., along its refracted direction and from its point of intersection with said first equivalent surface, in a magnitude equal to the distance traveled by the corresponding ray between said first initial surface and said second initial surface, and calculating its final position, which with each ray defines a point on said second equivalent surface, in other words, so that said equivalent optical path has its intermediate section equal to said initial optical path.

30. The method according to claim 23, characterized in that said ophthalmic lens is a progressive lens having a first power in its far vision area and a second power in its near vision area.

31. The method according to claim 23, characterized in that said second equivalent surface is a mixed surface.

32. The method according to claim 23, characterized in that said first equivalent surface is a spherical or aspherical surface.

33. The method according to claim 32, characterized in that said first equivalent surface is a spherical surface with a power equal to the mean value between said first power and said second power.

34. The method according to claim 32, characterized in that said first equivalent surface is an aspherical surface with a power equal to the mean value between said first power and said second power.

35. The method according to claim 34, characterized in that said first equivalent surface has positive asphericalness.

36. The method according to claim 23, characterized in that said first surface is a toric surface.

37. The method according to claim 23, characterized in that said computational model of said first and second initial surfaces of said initial lens is polynomial.

38. The method according to claim 23 characterized in that said computational model of said first and second initial surfaces of said initial lens are B-splines polynomials.

39. The method according to claim 23, characterized in that said plotting of a set of rays comprises the plotting of more than 1000 rays.

40. The method according to claim 23, characterized in that said plotting of rays creates at least one subset of rays parallel to one another.

41. The method according to claim 23, characterized in that said plotting of rays creates at least one subset of rays convergent on a point located on the side of the first initial surface.

42. The method according to claim 23, characterized in that said plotting of rays creates at least one subset of rays convergent on a point located on the side of the second initial surface.

43. The method according to claim 23, characterized in that after said step f. an interpolation takes place of said points of said second equivalent surface to construct said equivalent surface.

44. The method according to claim 43, characterized in that said interpolation includes the B-splines calculation.

45. An ophthalmic lens manufactured by means of a method according to claim 23.

46. An ophthalmic lens manufactured by means of a method according to claim 44.

47. The method for calculating an ophthalmic lens, said ophthalmic lens comprising a first surface opposite the eye of a user, and a second surface orientated towards the user's eye, wherein said ophthalmic lens having a first power in its far vision area and a second power in its near vision area and comprising the following steps:
   a. calculating an initial lens from a given prescription, where said initial lens defines a first initial surface and a second initial surface;
   b. constructing a computational model of said initial lens;
   c. first plotting of a set of rays using said computational model;
   d. calculating an initial optical path traveled by each ray using said computational model, wherein said initial optical path is the sum of three sections, a first section before said first initial surface, a second section between said first initial surface and said second initial surface and a third section after said second initial surface;
   e. pre-selecting a first equivalent surface of an equivalent lens to said ophthalmic lens, wherein said first equivalent surface is selected from the group consisting of: a spherical surface and an aspherical surface and has a power between said first power and said second power; and
   f. calculating a second equivalent surface of said equivalent lens by means of the plotting of each ray through said equivalent lens and determining the point of intersection of each of said rays with said second equivalent surface, where, in order to determine the point of intersection with said second equivalent surface it is necessary that: each ray has an equivalent optical path equal to said initial optical path, or each of said rays has at least one of the sections of said equivalent optical path equal to the corresponding section of said initial optical path, so that said equivalent lens thus calculated is said ophthalmic lens.

48. The method according to claim 47, where in said step f. it is necessary that each of said rays has an equivalent optical path that is equal to said initial optical path, characterized in that said step f. further comprises:

i. determining a wavefront made up of said set of rays after passing through said initial lens and determining a direction perpendicular to said wavefront at each of the points thereof so that each ray has a wavefront point and a perpendicular direction in said wavefront point;

ii. second plotting of each of said rays in the inverse direction, in other words, from said wavefront point and towards said initial lens, so that the rays are perpendicular to said wavefront;

iii. determining a candidate point on each ray in step f.ii., such that said candidate point defines the intersection between a corresponding ray and the second equivalent surface, iv. calculating, for each of said candidate points, a point on the first equivalent surface such that it is fulfilled that said corresponding ray passes through said candidate point, v. calculating the equivalent optical path corresponding to each ray in step f.iv. and checking that its difference vis-a-vis the corresponding initial optical path is less than an error value preset as permissible; and vi. if there is a greater difference than the permissible error value, determining a new candidate point and defining an iterative loop with steps f.iii. to f.vi.

49. The method according to claim 48, characterized in that the first of said candidate points of said iterative loop is a point that is at a distance from its corresponding wavefront point which is equal to said third section of the corresponding initial optical path.

50. The method according to claim 48 or claim 49, characterized in that the calculation of the intersection of each ray refracted with the first equivalent surface in step f.iv. is also repeated by means of a second iterative loop.

51. The method according to claim 50, characterized in that in said second iterative loop the corresponding point of the first initial surface is taken as the first approximation of the point of intersection with said first equivalent surface.

52. The method according to claim 47, characterized in that in said step f. it is necessary that each of said rays has an intermediate section of said equivalent optical path equal to an intermediate section of said initial optical path.

53. The method according to claim 52, characterized in that said step f. further comprises:

i. second plotting of each of said rays through said first equivalent surface;

ii. calculating each of the refracted directions of the rays in step f.i. once refracted by passing through said first equivalent surface; and iii. calculating the shift of each ray in step f.ii., along its refracted direction and from its point of intersection with said first equivalent surface, in a magnitude equal to the distance traveled by the corresponding ray between said first initial surface and said second initial surface, and calculating its final position, which with each ray defines a point on said second equivalent surface, in other words, so that said equivalent optical path has its intermediate section equal to said initial optical path.

54. The method according to claim 47, characterized in that said ophthalmic lens is a progressive lens.

55. The method according to claim 47, characterized in that said second equivalent surface is a mixed surface.

56. The method according to claim 47, wherein said first equivalent surface is aspherical and has positive asphericalness.

57. The method according to claim 47, characterized in that said first surface is a toric surface.

58. The method according to claim 47, characterized in that said first equivalent surface is a progressive surface different from said first initial surface.

59. The method according to claim 47, characterized in that said computational model of said first and second initial surfaces of said initial lens is polynomial.

60. The method according to claim 59 characterized in that said computational model of said first and second initial surfaces of said initial lens are B-splines polynomials.

61. The method according to claim 47, characterized in that said plotting of a set of rays comprises the plotting of more than 1000 rays.

62. The method according to claim 47, characterized in that said plotting of rays creates at least one subset of rays parallel to one another.

63. The method according to claim 47, characterized in that said plotting of rays creates at least one subset of rays convergent on a point located on the side of the first initial surface.

64. The method according to claim 47, characterized in that said plotting of rays creates at least one subset of rays convergent on a point located on the side of the second initial surface.

65. The method according to claim 47, characterized in that after said step f. an interpolation takes place of said points of said second equivalent surface to construct said equivalent surface.

66. The method according to claim 65, characterized in that said interpolation includes the B-splines calculation.

67. An ophthalmic lens manufactured by means of a method according to claim 47.

68. An ophthalmic lens manufactured by means of a method according to claim 66.

\* \* \* \* \*